United States Patent Office 3,084,108
Patented Apr. 2, 1963

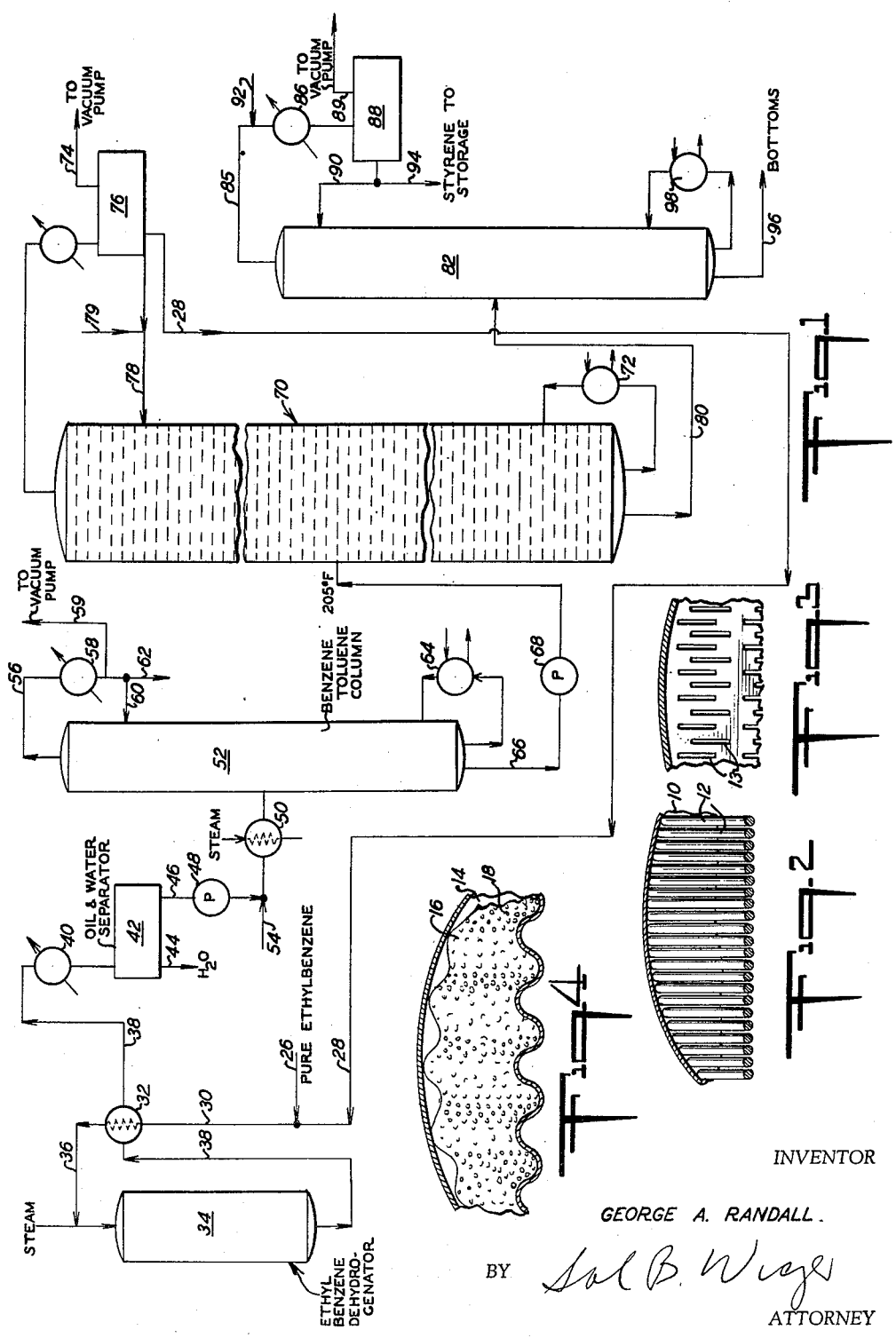

3,084,108
METHOD OF SEPARATING ETHYLBENZENE FROM STYRENE BY LOW PRESSURE DROP DISTILLATION
George A. Randall, Cambridge, Mass., assignor to Cosden Petroleum Corporation, Big Spring, Tex., a corporation of Delaware
Filed Jan. 17, 1958, Ser. No. 709,623
6 Claims. (Cl. 202—52)

This invention relates to separation of styrene from its reaction mixture with ethylbenzene formed by catalytic dehydrogenation of ethylbenzene, and particularly relates to improved distillation of such reaction mixture to separate styrene in a substantial degree of purity with a minimum of polymerization and with improved economy.

It is well known in the art to produce styrene by catalytic dehydrogenation of ethylbenzene and usually that styrene is separated relatively impure and with substantial yield loss by heat polymerization, even in the presence of polymerization inhibitors. The separation of styrene from ethylbenzene by distillation has been in bubble tray column stills provided with numerous bubble decks, heretofore exclusively used in this art because that is the most efficient type of still known to practically separate relatively close boiling substances by distillation. It is particularly deemed to be necessary in the separation of styrene and ethylbenzene which, boiling so relatively close together, i.e. within 10° C., that type of still appeared to be the only useful type. Moreover, commercial mixtures containing styrene, for instance, styrene occurring in drip oil from coal tar distillate or gas tar, or styrene produced by dehydrogenation of ethylbenzene obtained from alkylation of benzene, contains numerous other close boiling hydrocarbon components, some boiling higher, others lower, and some intermediate between ethylbenzene and styrene, notably xylenes, whereby separation of the styrene from such mixture would be considered impossible in a type of distillation other than such most efficient bubble tray columns.

Such bubble tray column, even with a minimum quantity of fluid per tray, has a pressure drop of at least about 4 mm. Hg abs. per tray. The total pressure drop from the bottom to the top of a multistage still is the summation of the pressures to be overcome by vapors from each stage. Moreover, the necessary minimum number of trays to produce good separation of such mixture of close boiling hydrocarbons can be reasonably closely calculated from past experience. The styrene is generally the least volatile of the mixture. Hence, it has been necessary to heat the mixture in the bottom of the still to a temperature and corresponding vapor pressure sufficiently high to cause vaporization of the components in the still and bubble the same upward through the numerous stages of the still. The necessary excess temperature above the boiling point of the styrene (about 230° F.) to which the mixture must be heated to effect styrene vaporization and fractional distillation from other hydrocarbon components in a column of the necessary number of trays for efficient separation, even operated under vacuum, has caused an uneconomically great polymerization of the styrene in the product, thereby not only decreasing the yield of monomeric styrene, but giving rise to the formidable problem of removal of styrene polymer from the apparatus, interfering with continuous distillation. Much effort in the art has been directed to ready removal of such polymer formed in the still.

It has been proposed in the art to divide the still into several columns, each of the efficient bubble cap tray type but with insufficient trays to effect good fractional distillation and, in effect, apply a rough stripping type distillation in each column while operating all under reduced pressure. It is proposed therein merely to rough strip an ethylbenzene fraction overhead containing substantially no styrene, simultaneously withdrawing from the bottom of the column a mixture richer in styrene and somewhat poorer in ethylbenzene. The bottoms withdrawn from the first column is sent as reflux to the top of a second similar column, but in this instance, the second still is also operated only as a stripper, passing overhead all of the ethylbenzene, together with a substantial quantity of the styrene, thereby assuring that the residue bottoms was essentially free of ethylbenzene. The overhead product from that second still is condensed and recycled to a reboiler of the first column. Finally the styrene still bottoms is distilled in a third column to separate styrene from high boiling ends. It is claimed for that method that the temperature to which the styrene needs to be heated by this triple distillation can be reduced as much as 20° F., however, it is quite inefficient in equipment, heat losses and yield.

According to the primary object of this invention, I have found that if the distillation to separate styrene from its admixture with other reaction components of ethylbenzene dehydrogenation is carried out in a column whose trays are so perforated that the liquid reflux in contact with each tray forms only a discontinuous film, as hereinafter described in detail, in effect a generally inefficient type of tray, but with a very low pressure drop per tray, styrene may be separated with markedly less polymerization in a single distillation column at reduced pressure, and if the styrene containing mixture is protected by inhibitors, substantially no polymerization. This discontinuous film means that the liquid at each tray continuously descends thereby minimizing the time of exposure of styrene monomer to the high distillation temperature which also is a factor in the resulting low polymerization.

More particularly, I have found that substitution of such comparatively inefficient type of tray, but which has a lower pressure drop per tray than the usual bubble tray, will, using a sufficient number of trays, allow very efficient fractional separation of styrene from its reaction product mixture. This allows substitution of a single column still for the several columns heretofore needed. It allows distillation with minimum polymerization in the still with consequent higher styrene yield. Finally, the styrene ultimately produced will have high purity which may exceed 99.6%, as to be useful for polymerization to clear styrene polymer.

As indicated above, a minimum pressure drop available in a bubble type tray in view of the continuous film or head of refluxing liquid thereon, is about 4 mm. Hg abs. The still as used herein, in contrast, has perforations, slots or grids comprising each tray whereby no continuous liquid film or reflux can collect on the tray. Consequently, using a discontinuous film tray according to the present invention, the pressure drop per tray will range from .9 to 1.3 mm. Hg abs. per tray depending upon the type of tray of which several are known in the general distillation art. It is clear that for equal pressure drops one could substitute approximately four such discontinuous film type trays for each bubble cap type tray. Such discontinuous film or perforated trays are comparatively inefficient.

Particularly, I have found that with the use of this perforated type of tray I can distill ethylbenzene from its styrene reaction product mixture in very sharp fractional distillation in a single column type still by addition of more stages of this low pressure drop type. I have found, however, that the use of more of such perforated trays, each of which only slightly increases the pressure drop, more than offsets that expected inefficiency.

In other words, I have found that the inefficiency of this type of tray is well offset by increasing the number of trays, and the total pressure drop resulting from addition of more trays is sufficiently low to allow styrene distillation from its ethylbenzene dehydrogenation mixture in a single column under vacuum and at a temperature well below that at which significant styrene polymerization results, that is, below about 215° F.

The advantages of this discovery are immediate. Most important is the fact that a true fractional distillation, in contrast to mere stripping, is possible at a temperature below which polymerization in the presence of inhibitors is significant. With the use of a single column there is great saving in equipment needed to produce the pure styrene, while reducing stoppage of the distillation column with polymerization and consequent greater pure styrene yield in practically continuous distillation.

In another advantage of this invention, I havt found that a substantially pure styrene can be produced by dehydrogenating an ethylbenzene which contains less than 1% of and preferably less than 0.2% of other $C_8$ hydrocarbon, such as the xylenes, as impurity, using an ethylbenzene having a purity exceeding about 99% and preferably 99.8%. The production of such ethylbenzene is described in my co-pending application Serial No. 672,053, filed July 15, 1957, and now U.S. Patent No. 2,959,626, as to which I am joint inventor with Dan M. Krausse, and which is assigned to the same assignee as the present application. When using such highly purified ethylbenzene as raw material, the dehydrogenation reaction product contains substantially no impurities, such as xylenes, which interfere with the efficient separation of the styrene from the ethylbenzene, other than the readily removed few percent of lower aromatics, such as benzene and toluene or heavier hydrocarbon ends.

Accordingly, in the separation of styrene from the ethylbenzene according to the preferred practice of this invention, it becomes possible to produce a very pure styrene and with a minimum of polymerization in the still whereby it is in higher yields. Most important, the styrene produced may be of polymer grade purity. For instance, while styrene containing up to 1% of other impurity, such as xylenes or ethylbenzene, is useful for the production of synthetic rubber, such as GRS, the production of clear water white polymers from the styrene is only possible where the styrene contains less than 0.4% of other hydrocarbon impurity. Moreover, the total hydrocarbon mixture comprising the dehydrogenation reaction product of substantially pure ethylbenzene does not need a total preliminary fractionation to remove heavy ends, since there are few, if any. Instead, after only a light preliminary fractionation preferably under vacuum and distilling at a temperature well below that critical for polymerization of styrene, to remove the more volatile benzene and toluene, the ethylbenzene is separated from a relative pure styrene in a single vacuum distillation using a single column of perforated trays.

Finally, as a precautionary measure, it is preferred to maintain an inhibitor in the styrene containing liquid throughout its entire processing sequence.

The invention is further described in relation to the drawings, wherein

FIG. 1 is a flow diagram illustrating the assembly of apparatus units;

FIG. 2 illustrates a type of perforated tray wherein the perforations are in the form of slots, the tray comprising a grid of assembled bars; and FIG. 3 illustrates a type of tray wherein the slots are shorter; and FIG. 4 shows another type of tray wherein the perforations are numerous holes in an undulated or wave surface.

Referring first to FIG. 2, a tray 10 is described comprising numerous bars 12 mounted parallel to each other as to form a grid having fine grooves separating each bar. The tray has no down-take tube; instead, the reflux liquid condensed upon a tray merely drips through the grid bars 12 from tray to tray. There is no continuous or even layer of fluid extending over the entire surface of the tray as in a bubble cap whereby the pressure drop is at a minimum, as stated, in the range of about .9 to 1.3 mm. Hg abs. That type of tray shown in FIG. 2 is referred to as a grid tray. FIG. 3 illustrates a type of tray similar in principle but the slots 13 are discontinuous.

FIG. 4 illustrates another form of tray comprising a perforated metal sheet 16 having small holes 18 perforated entirely through the metal sheet and the entire plate may be waved or undulated into numerous corrugations. This type of tray, too, has a very low pressure drop because the reflux liquid condensing thereon is discontinuous and does not collect thereon in a film or layer, but drips through the perforations continuously from tray to tray. Such tray, usually referred to as a ripple tray, may similarly be mounted in a column usually without downcomers.

The trays of either grid, slot or ripple type have perforations as well as lands or intermediate metal allowing gas and liquid to pass through the tray in either direction and in intimate contact during distillation; but no continuous film of liquid can collect on the tray to form a significant hydrostatic head to greatly resist the upward passage of vapors during distillations.

Referring to FIG. 1, ethylbenzene enters the system through line 26 and is passed together with ethylbenzene recycle in line 28 through line 30. The combined feeds after hot effluent product heat exchange in exchanger 32 are passed into the top of ethylbenzene dehydrogenator 34 together with process steam by way of line 36. The dehydrogenator 34, as known in the art, comprises catalyst beds which remove hydrogen from the ethylbenzene in the presence of steam, converting it to styrene. The reaction product comprising principally styrene and ethylbenzene with a few percent of benzene and toluene, passes through line 38 by way of heat exchanger 32 to condenser 40. The condensed liquid then passes to an oil and water separator 42 wherein the condensed steam is withdrawn through line 44. The crude styrene reaction product is withdrawn through line 46 by pump 48 and has added thereto a sulfur solution from line 54 to inhibit polymerization; after preheating to about 165–194° F. in exchanger 50, the inhibited solution is sent to the center of a benzene-toluene stripping column 52.

The column 52 is operated at reduced pressure of 150 to 175 mm. Hg abs. and heated at the bottom of the column to a maximum temperature of 215° F., preferably about 194° F. The benzene-toluene overhead from line 56 is cooled in condenser 58, a portion being returned through line 60 as reflux and the remainder sent to benzene-toluene recovery by way of line 62. The pressure on the still is maintained by a vacuum pump through line 59. The heat for the stripping operation in line 52 is supplied by reboiler 64. The crude stripped ethylbenzene-styrene reaction product is withdrawn from the bottom of the still 52 by line 66 and pumped by pump 68 at a temperature of about 194° F. to the center of the single styrene recovery column 70. That styrene recovery column comprises about 80–100 low pressure drop trays of the type described in FIGS. 2 or 3, preferably about 85–95, and is operated at reduced pressure in the range of 25 to 100 mm. Hg abs., generally below about 50 mm. abs., preferably about 25–50 abs. and is operated at from 75–100 mm. abs. pressure drop from the bottom to the top whereby the ethylbenzene is withdrawn overhead at a temperature in the range of about 118–128° F. and the bottom temperature of the column is maintained at 165–215° F. at an abs. pressure of from 100–150 mm. Hg abs. The temperature at the bottom of the column of 165 to 215° F. is maintained by reboiler 72 and the pressure at the top of the column of 25–50 mm. Hg is maintained by a vacuum pump communicating by way of line 74 with accumulator 76. The vapors passing up through the column against the pressure drop of 80–100 trays established the pressure at the bottom of the column.

The ethylbenzene accumulating in accumulator 76 has a portion thereof returned the the top of the column by way of line 78 as reflux and another portion passes through line 28 returning as recycle to the ethylbenzene dehydrogenator 34. Styrene from which the ethylbenzene has now been distilled is relatively pure and needs no further treatment. However, it is usually desirable at least to remove the sulfur inhibitor to apply a finishing distillation. For that purpose it is withdrawn through line 80 and sent to the center of a final styrene finishing column 82 which may also be operated under vacuum and which also may have its stages formed of discontinuous reflux film type trays of the low pressure type described. Better than 99% styrene is produced in still 82 and usually better than 99.4% in high yield passes overhead of the column 82 through line 84, cooled by condenser 86, passes to accumulator 88, a portion being returned through line 90 as reflux and a portion sent to storage as finished styrene. This still also is operated at low pressure maintained by a vacuum pump through line 89. The still 82 operating on a relatively pure styrene, needs fewer stages and in effect is essentially a final stripping still merely to remove traces of heavy ends and non-volatile inhibitor, such as sulfur. It may be operated at reduced top pressure of 10 to 50 mm. Hg and reduced bottom pressure of 25 to 75 mm. The number of trays or stages may vary more widely from about a minimum of 10, and preferably 15 to 25 stages. The preferred maximum bottom temperature as in column 70 will be about 194° F. which will usually be considerably lower depending on the number of stages and degree of vacuum, usually 160 to 194° F., maintained by reboiler 98.

It is desirable that the styrene containing fluid be protected against oxidation and polymerization throughout its processing. As indicated, sulfur is the preferred inhibitor added through line 54 before distillation. Additional inhibitor can be adedd through line 79 from which it passes into the top of column 70 as reflux by way of line 78, so that the reflux vapors at the top of the styrene recovery column 70 are protected by inhibitor, preferably non-volatile, such as sulfur. Again, in the styrene finishing column, it is desirable to protect the styrene by addition of inhibitor to distilled vapors and such inhibitor may be added by line 92 into the styrene overhead line 85 from which a portion passes with the reflux through line 90 and a portion is withdrawn with the finished styrene in line 94. It is generally preferred in the first stages of protection of the crude mixture from polymerization, to use a non-volatile inhibitor, such as sulfur, to protect the styrene from polymerization, and such is added in line 54. However, it is preferred to stabilize the finished styrene with an antioxidant type inhibitor such as tertiary butyl catechol, which will be added in line 92 so as to remain in part with the finished product, passing through line 94, for continued stabilization thereof. Some small quantities of styrene remain in the bottoms withdrawn through line 96 from finishing still 82 and such may be further processed if desired for recovery of small quantities of styrene.

The following example illustrates the practice of this invention.

Example

Ethylbenzene formed as described in my co-pending application of 99.9% purity is catalytically dehydrogenated with steam in a manner known in the art to form a crude dehydrogenation product comprising 1.1 mol. percent benzene, 5.6 mol. percent toluene, 60.1 mol. percent ethylbenzene, 33.2 mol. percent styrene, and 0.1 mol. percent high boiling ends. This mixture preheated to about 190° F. is passed continuously first to a preliminary stripping column having a bottom temperature of about 194° F. operated at a top pressure produced by vacuum pump of about 160 mm. Hg abs. The bottoms are pumped to the intermediate point of a styrene recovery column comprising 95 trays of the grid type described in FIG. 2, ethylbenzene being taken overhead at a pressure of about 30 mm. Hg abs. and a temperature of 120° F. with a bottom temperature maintained by a reboiler of 190° F. The ethylbenzene overhead has 75% by volume of reflux returned to the top of the column and 25% of the net overhead is recycled to the ethylbenzene dehydrogenator. The styrene bottoms are sent to a styrene finishing column having 25 grid trays of the same type as the styrene recovery column preceding it. The finishing column is operated at a top pressure of about 18 mm. Hg abs. at an overhead temperature of about 114° F. produced from a bottom temperature of about 175° F. at an abs. pressure of about 38 mm. Hg. About 15% of the overhead styrene product is returned to the top of the column as reflux. The bottoms of the styrene column contain about 25% of recoverable styrene which may be further recovered in a batch still, whereby styrene having a purity of 99.6% is recovered continuously from the top of the finishing still. In actual operation, according to this example, the crude styrene mixture with other hydrocarbons formed in the ethylbenzene dehydrogenation has added thereto a 2% solution of sulfur in ethylbenzene in total quantity to impart an overall sulfur content of 0.01% to the crude hydrocarbon mixture before heating to strip the benzene and toluene; and a similar quantity of sulfur is again added to the reflux line at the top of the styrene recovery column. The finally finished pure styrene before sending to storage, has incorporated therein 0.01% of tertiary butyl catechol as a polymerization inhibitor as well as anti-oxidant.

As thus described, a method and apparatus is provided for substantially continuous production of styrene of high purity by accurate fractional distillation of the styrene from its mixture with ethylbenzene in a single column still having perforated, discontinuous film type trays in sufficient number to effect an accurate fractional distillation under vacuum at a temperature below that at which no significant polymerization takes place.

I claim:

1. The method of separating ethyl benzene from styrene in a manner to prevent styrene polymerization, comprising distilling the mixture in a multi-stage column having between 80 and 100 low pressure drop stages, at a top pressure between 25 and 50 mm. Hg abs., there being a total pressure drop from the bottom to the top of said column in the range of 75 to 100 mm. Hg abs., the ethyl benzene being withdrawn overhead at a top column temperature in the range of 118 to 128° F. and styrene being withdrawn at a bottom column temperature of about 165 to 215° F. and at a bottom pressure in the range of 100 to 150 mm. Hg abs., the separated ethyl benzene overhead being substantially free of styrene and the styrene being substantially free from ethyl benzene.

2. The method as defined in claim 1 wherein the low pressure drop stages therein are provided by the limited collection of thin liquid films at each stage.

3. The method of separation of ethylbenzene from styrene in a manner to prevent substantial styrene polymerization, comprising distilling the mixture at reduced pressure in a multi-stage column having sufficient low pressure drop stages, less than about 100, to effect close fractional separation, each stage having a pressure drop less than about 4 mm. Hg abs., at a top pressure between 25 and 100 mm. Hg abs., the ethylbenzene being withdrawn overhead at a top column temperature sufficiently high to maintain the ethylbenzene vaporized, exceeding about 118° F., the styrene being withdrawn at a bottom column temperature below about 215° F. and a corresponding bottom pressure, the separated ethylbenzene being substantially free of styrene and the styrene being substantially free from ethylbenzene.

4. The method as defined in claim 3 wherein the low pressure drop stages are provided by the limited collection of liquid films at each stage.

5. The method as defined in claim 3 wherein the low pressure drop stages are provided by horizontal discontinuous liquid films collected at each stage upon grid trays.

6. The method of separating ethylbenzene from styrene in a manner to prevent substantial styrene polymerization comprising distilling the mixture at reduced pressure in a multi-stage column having sufficient low pressure drop stages, less than about 100, to effect close fractional separation, each stage having a pressure drop in the range of about 0.9 to 1.3 mm. Hg abs., at a top pressure between about 25 and 50 mm. Hg abs., there being a total pressure drop from the top to the bottom of said column in the approximate range of 75 to 100 mm. Hg abs., the ethylbenzene being withdrawn overhead at a top column temperature in the approximate range of 118 to 128° F. and styrene being withdrawn at a bottom column temperature of about 165 to 215° F. and at a bottom pressure in the approximate range of 100 to 150 mm. Hg abs., the separated ethylbenzene overhead being substantially free of styrene and the styrene being substantially free from ethylbenzene.

References Cited in the file of this patent

UNITED STATES PATENTS

| | | |
|---|---|---|
| 63,970 | Waters | Apr. 16, 1867 |
| 2,370,948 | Gadwa | Mar. 6, 1945 |
| 2,531,327 | Elwell | Nov. 21, 1950 |
| 2,555,939 | Sherwin | June 5, 1951 |
| 2,564,078 | Pyle | Aug. 14, 1951 |
| 2,581,881 | Pyle | Jan. 8, 1952 |
| 2,682,394 | Guthrie et al. | June 29, 1954 |
| 2,809,820 | Stoops | Oct. 15, 1957 |
| 2,868,696 | Skinner | Jan. 13, 1959 |

FOREIGN PATENTS

| | | |
|---|---|---|
| 1,094,081 | France | Dec. 1, 1954 |